Sept. 29, 1925.
A. M. STANLEY ET AL
1,555,034
MACHINE FOR WELDING TUBULAR ARTICLES
Filed May 11, 1921     11 Sheets-Sheet 1
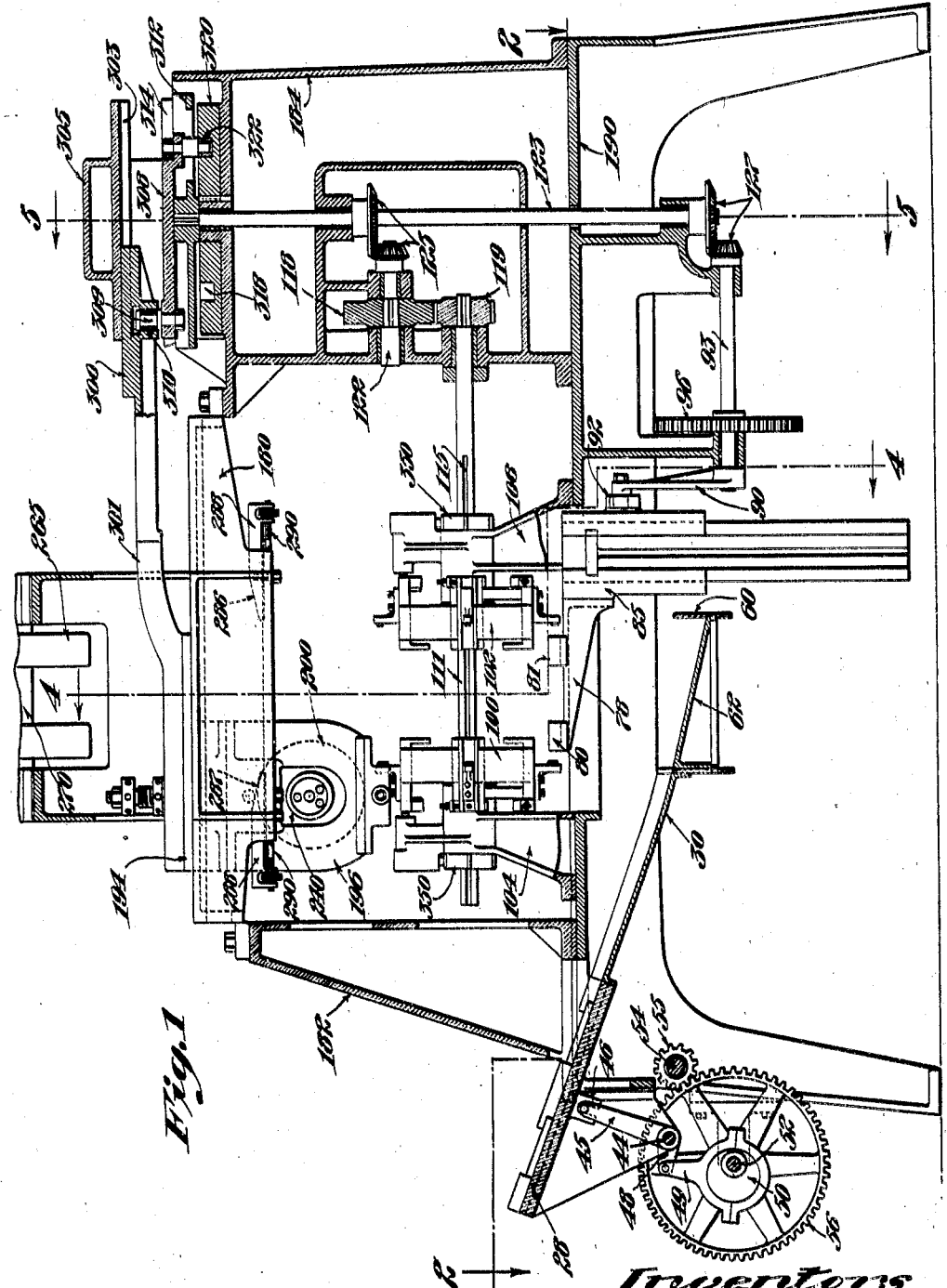

Sept. 29, 1925.
A. M. STANLEY ET AL
1,555,034
MACHINE FOR WELDING TUBULAR ARTICLES
Filed May 11, 1921   11 Sheets-Sheet 2
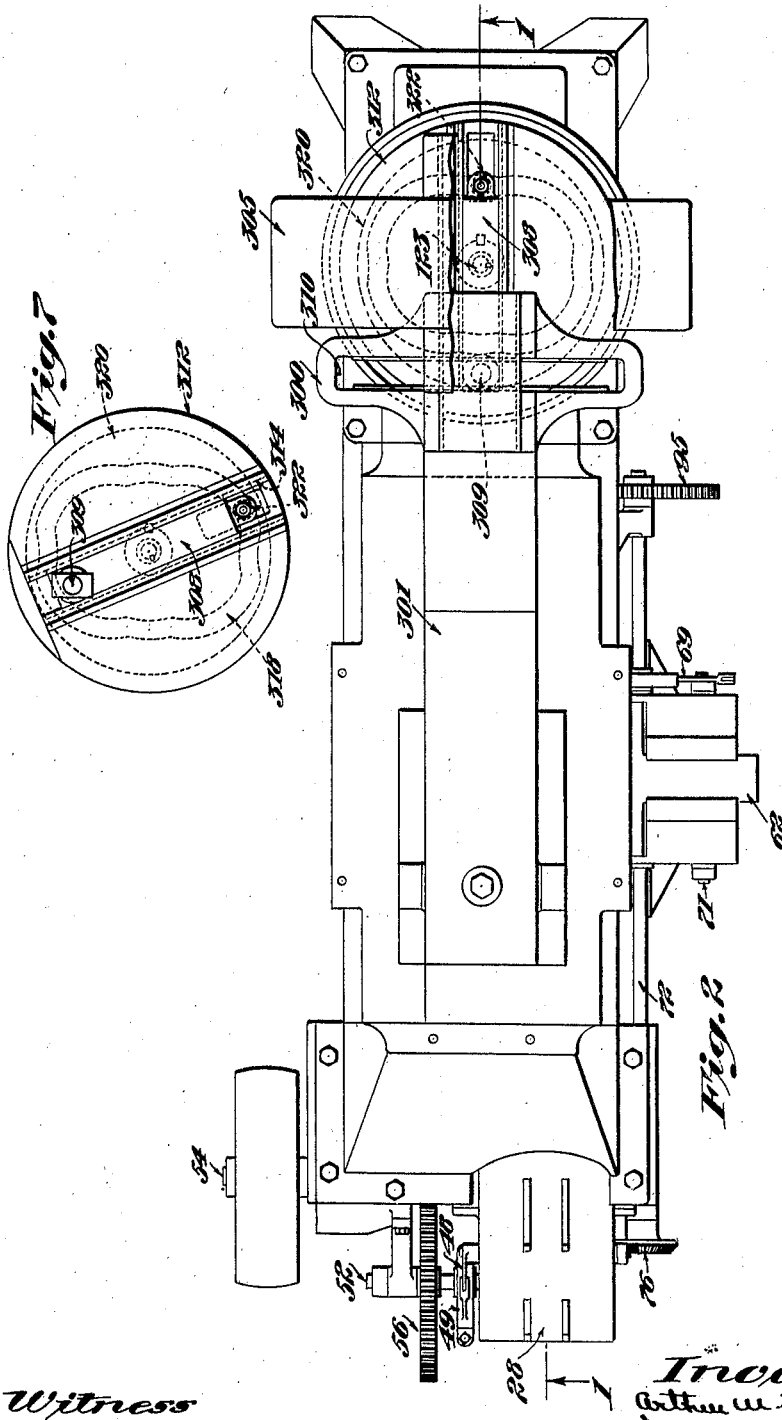

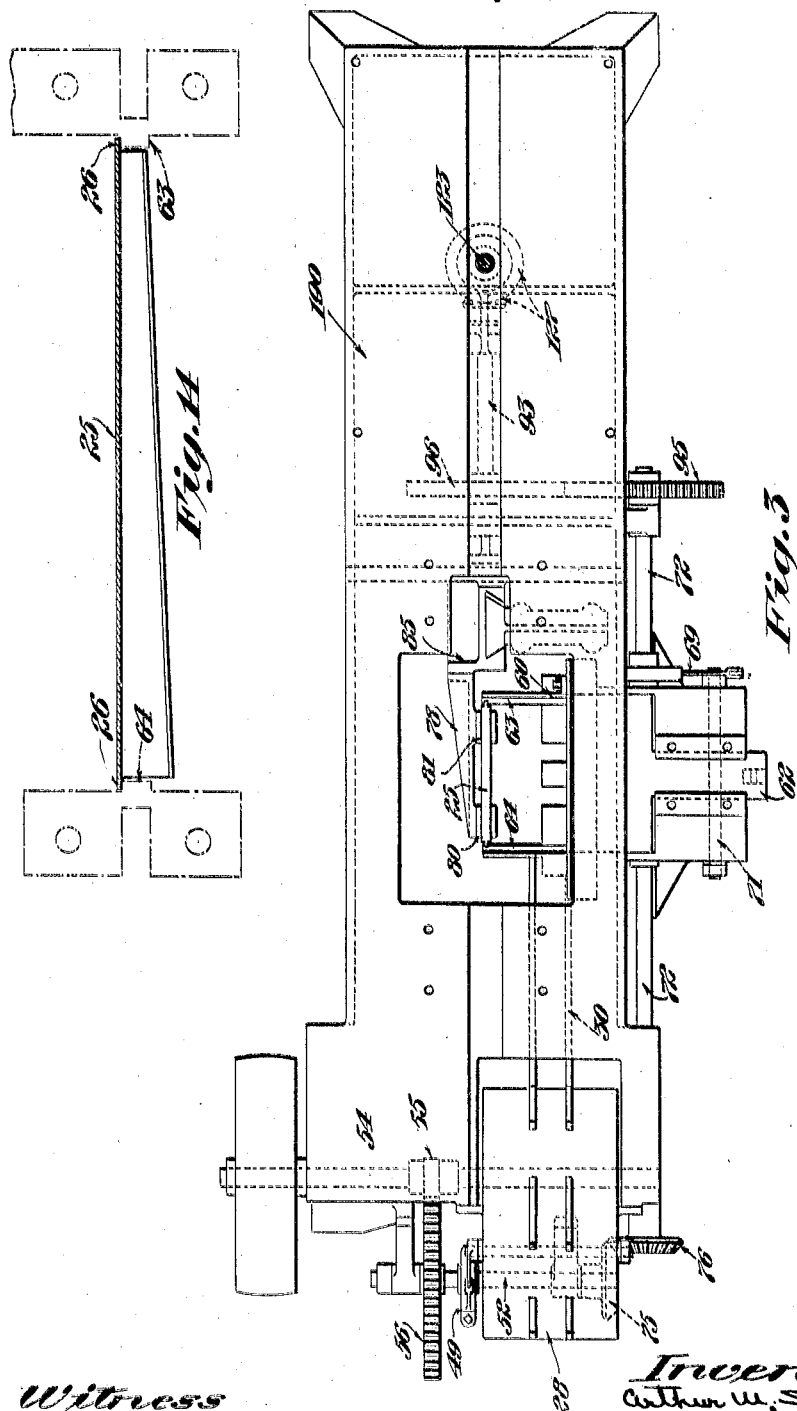

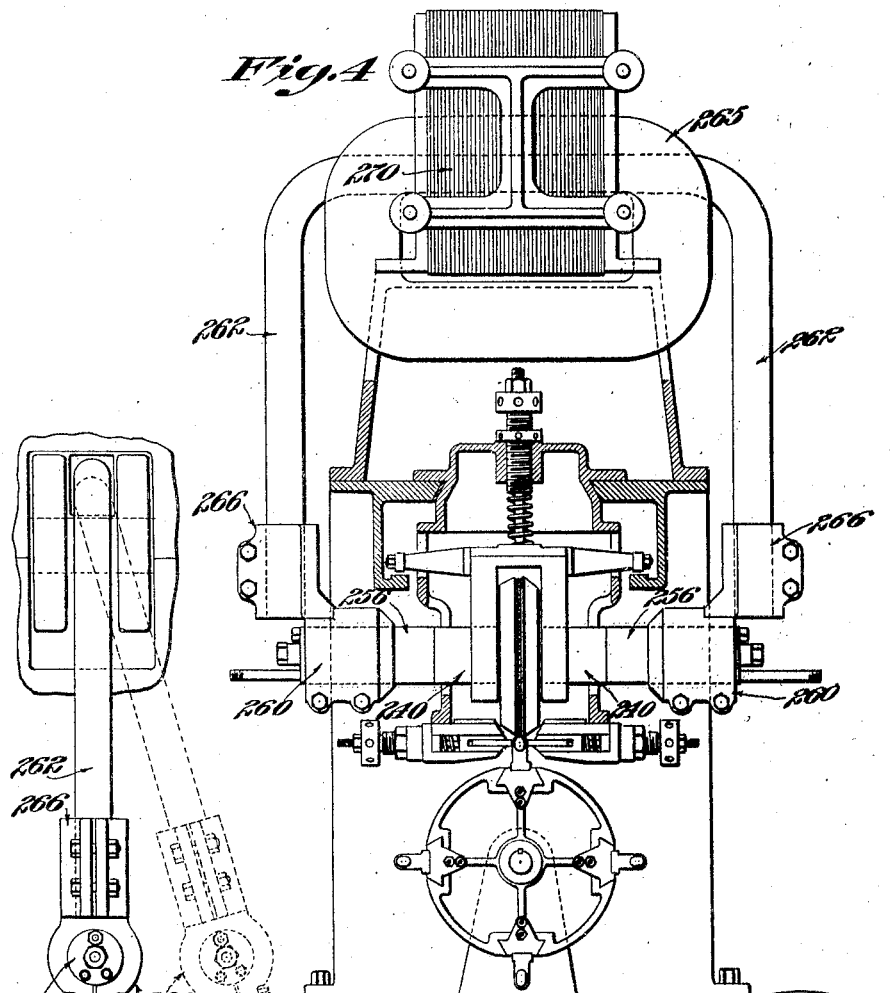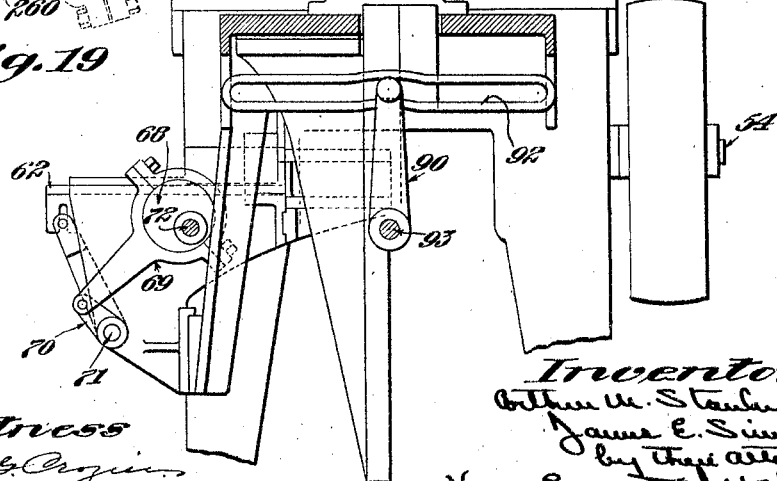

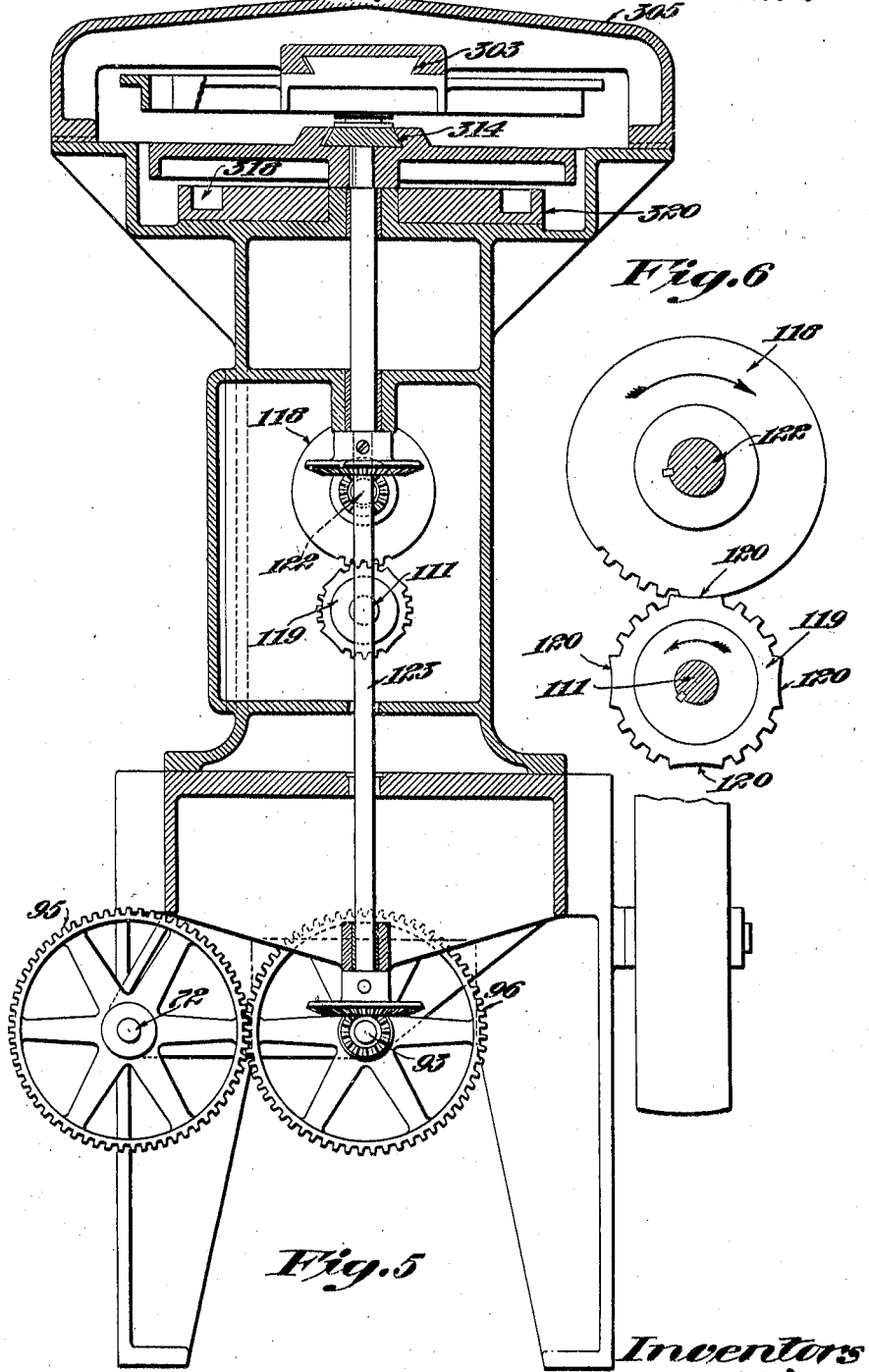

Sept. 29, 1925.
A. M. STANLEY ET AL
1,555,034
MACHINE FOR WELDING TUBULAR ARTICLES
Filed May 11, 1921    11 Sheets-Sheet 6
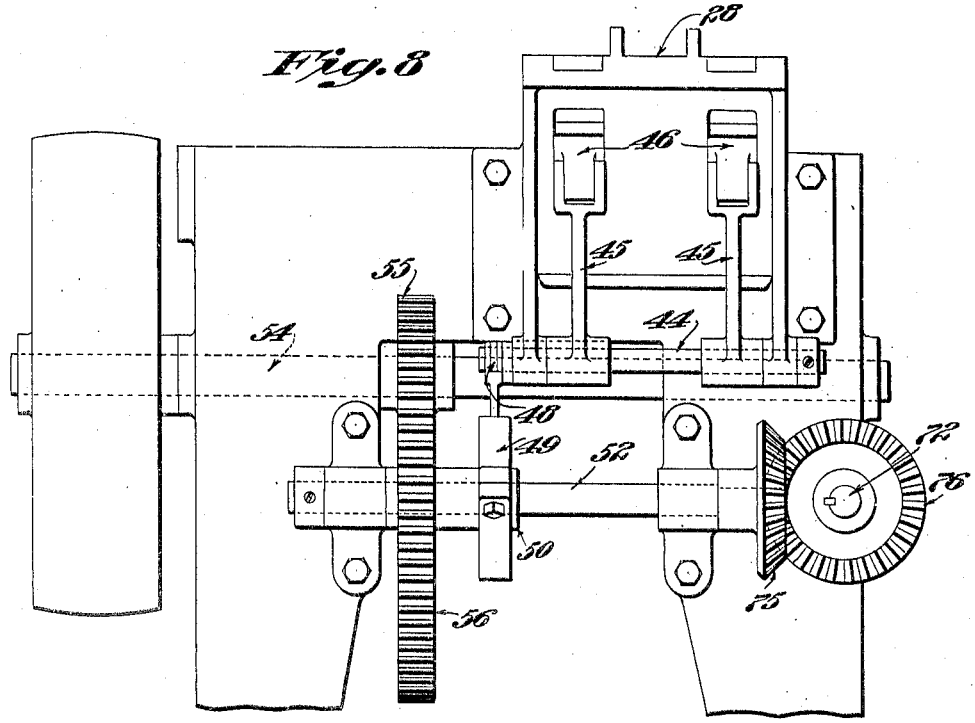
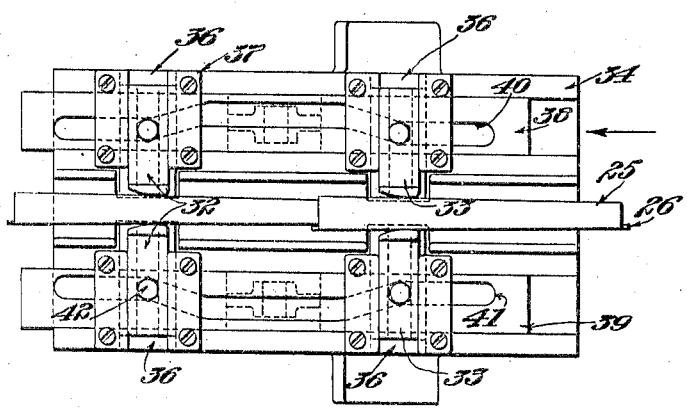

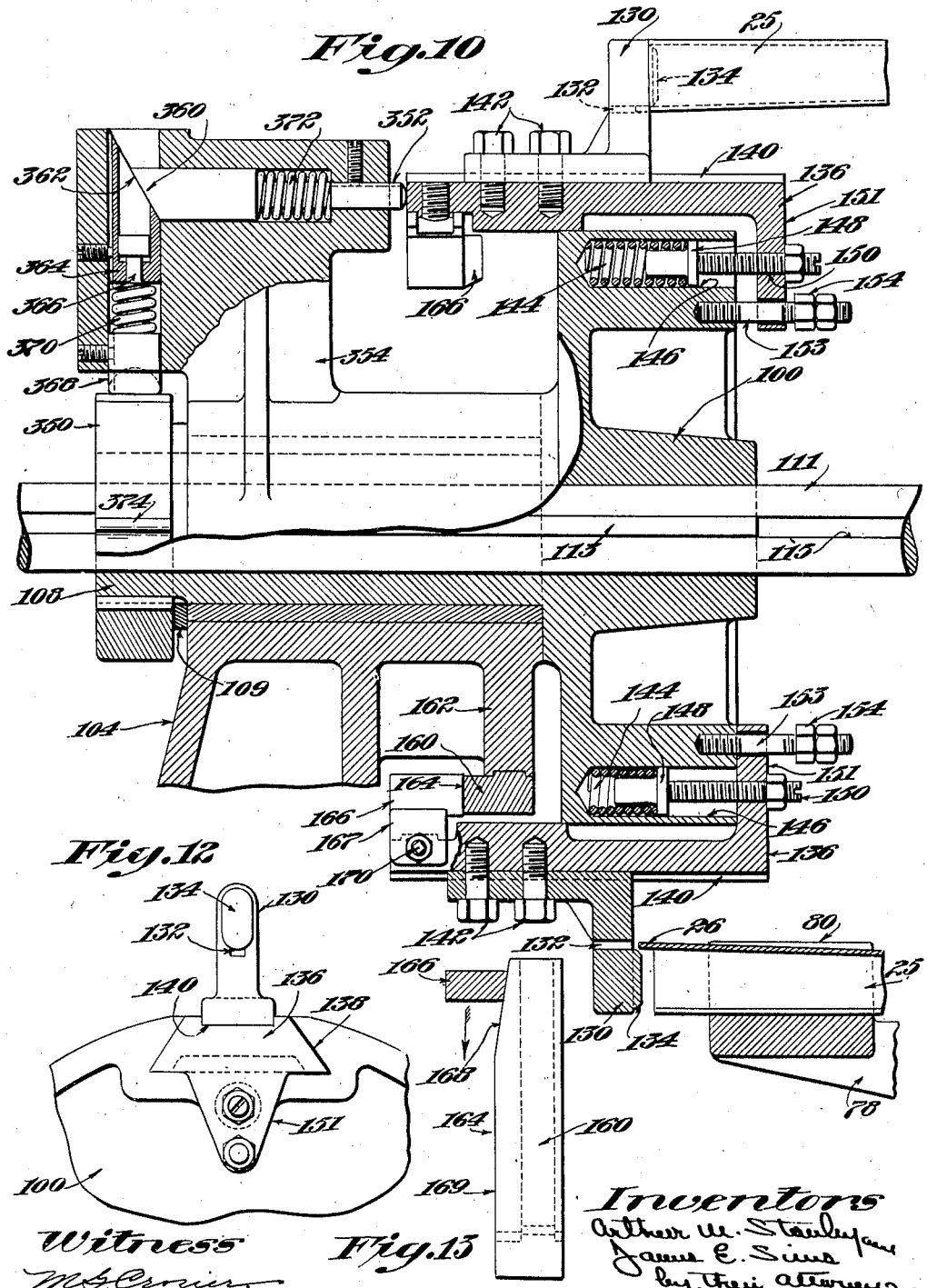

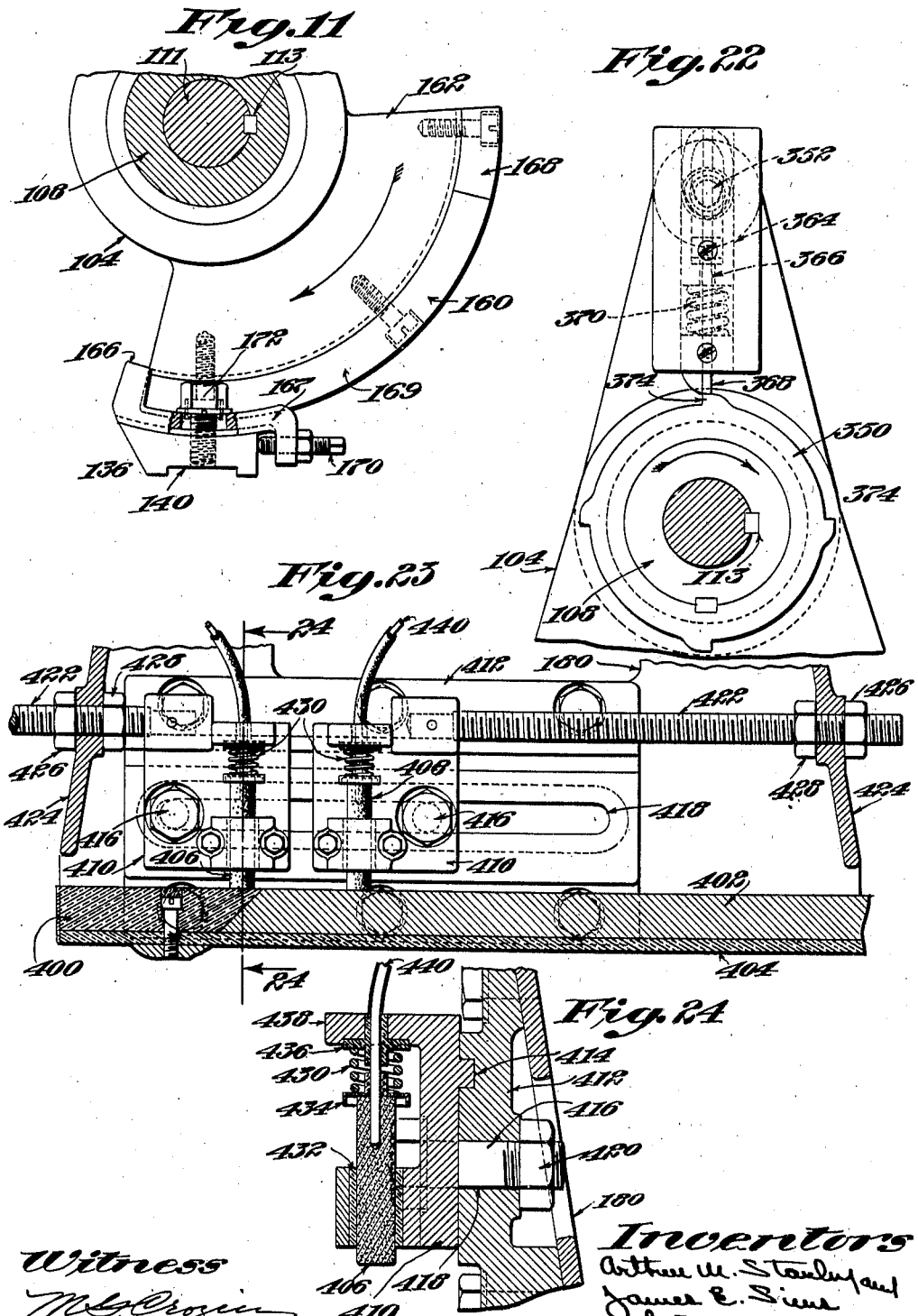

Sept. 29, 1925. 1,555,034
A. M. STANLEY ET AL
MACHINE FOR WELDING TUBULAR ARTICLES
Filed May 11, 1921 11 Sheets-Sheet 9
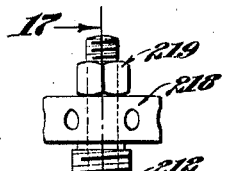
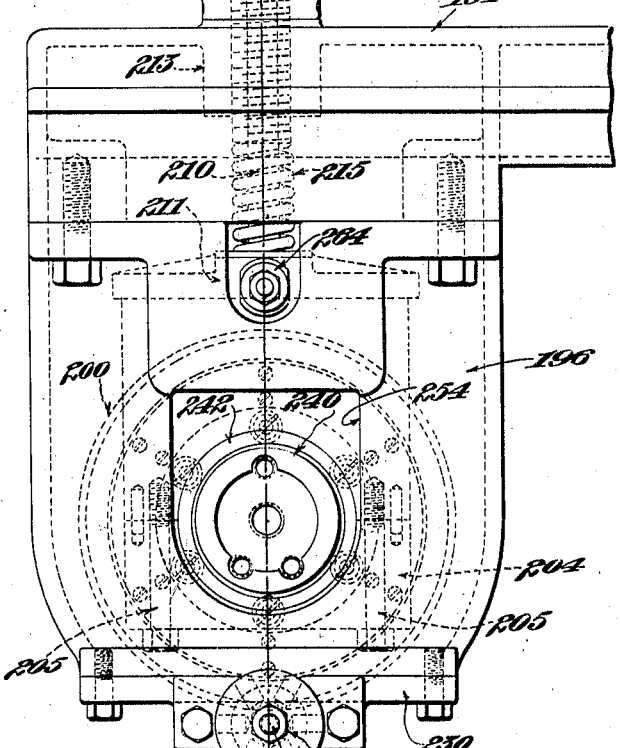
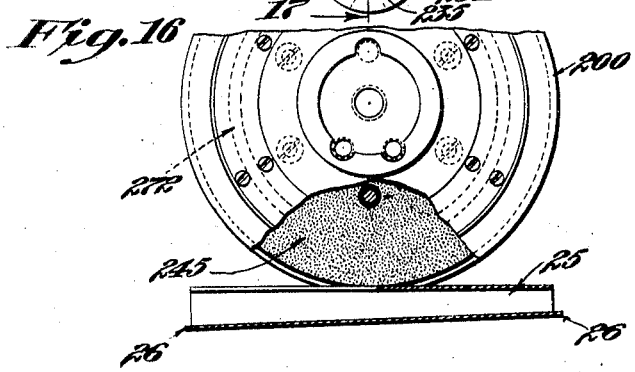

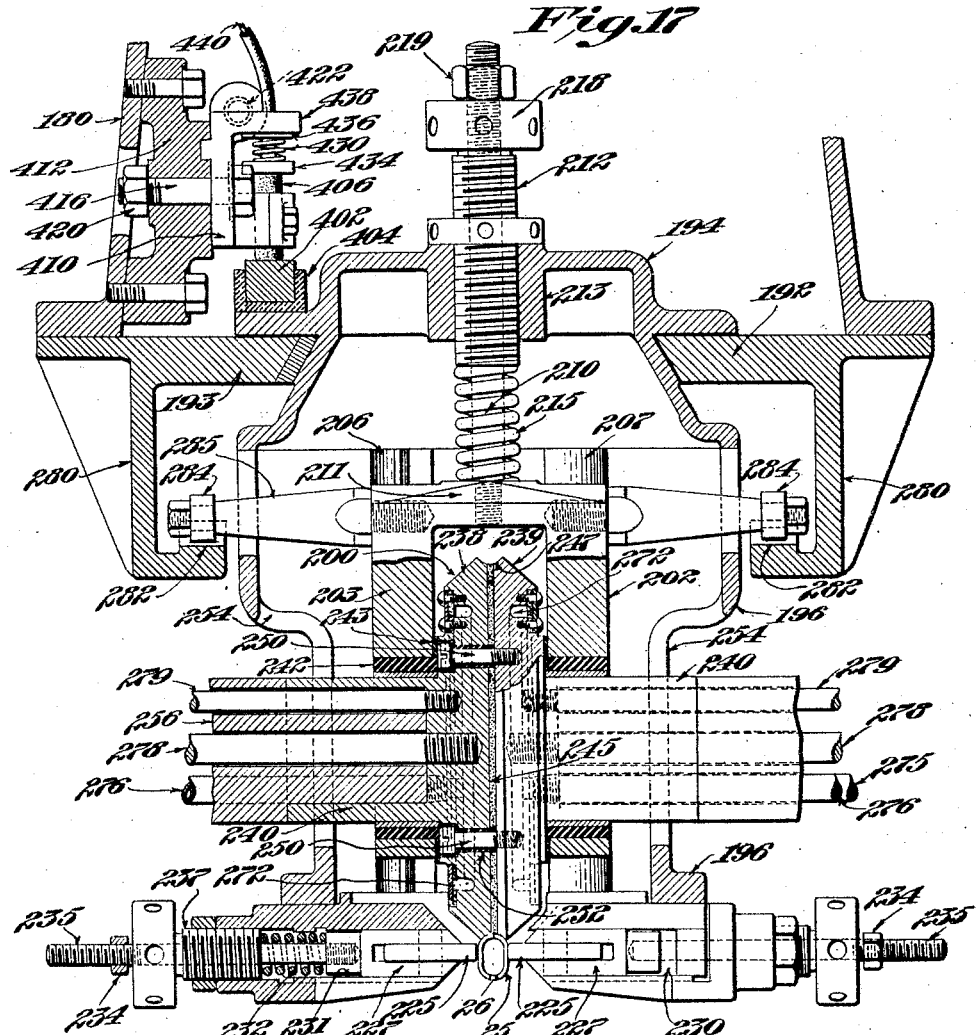
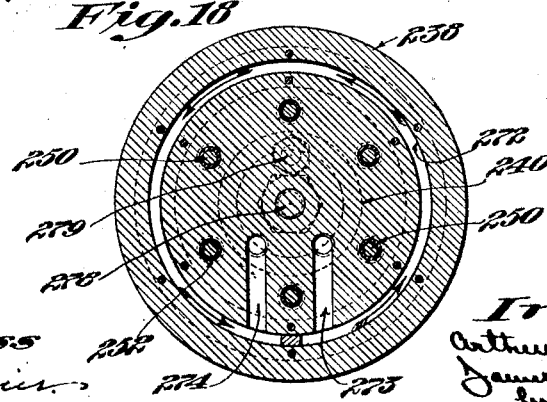

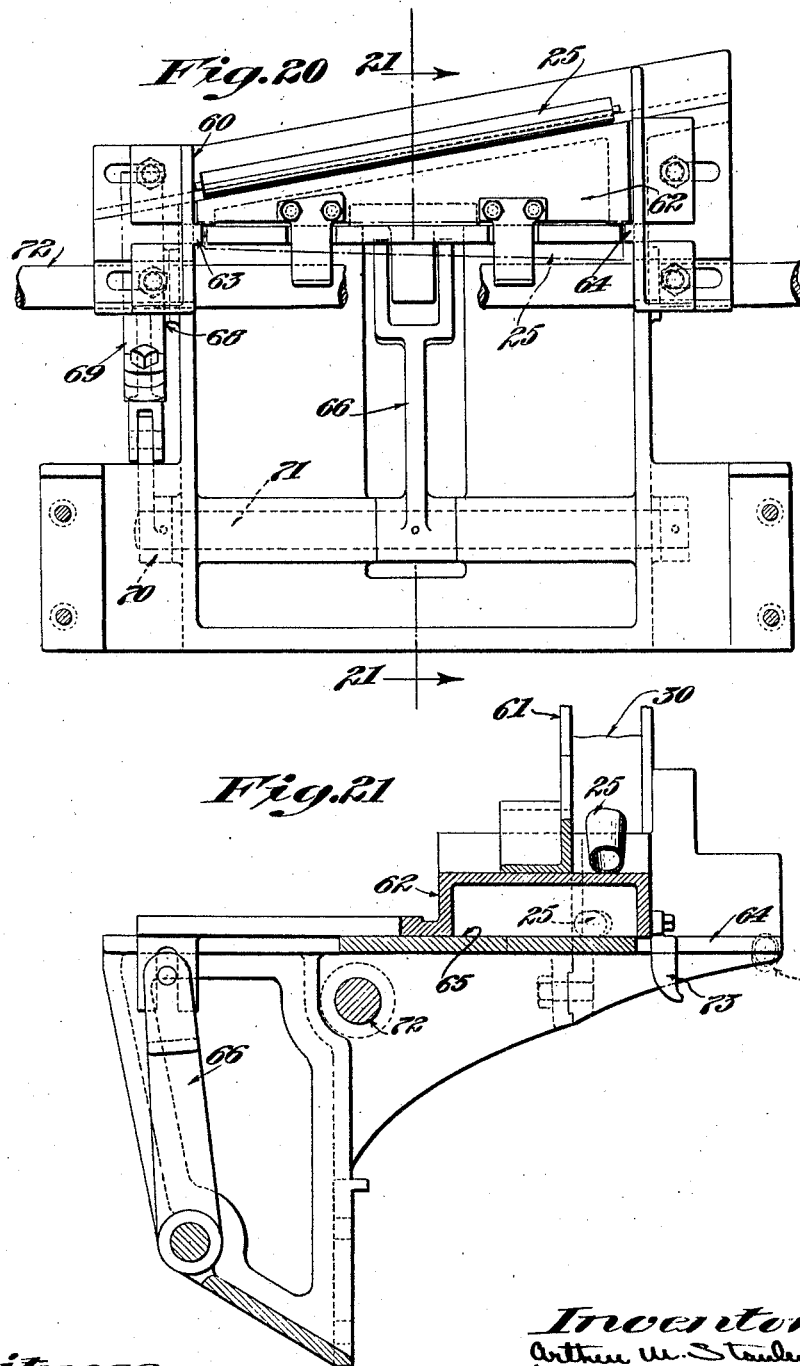

Patented Sept. 29, 1925.

1,555,034

UNITED STATES PATENT OFFICE.

ARTHUR M. STANLEY, OF LYNN, AND JAMES E. SIMS, OF QUINCY, MASSACHUSETTS, ASSIGNORS TO STANLEY STEEL WELDED WHEEL CORPORATION, OF BOSTON, MASSACHUSETTS, A CORPORATION OF DELAWARE.

MACHINE FOR WELDING TUBULAR ARTICLES.

Application filed May 11, 1921. Serial No. 468,642.

*To all whom it may concern:*

Be it known that we, ARTHUR M. STANLEY and JAMES E. SIMS, citizens of the United States, residing at Lynn, in the county of Essex and Commonwealth of Massachusetts, and Quincy, in the county of Norfolk and Commonwealth of Massachusetts, respectively, have invented certain new and useful Improvements in Machines for Welding Tubular Articles; and we do hereby declare the following to be a full, clear, and exact description of the invention, such as will enable others skilled in the art to which it appertains to make and use the same.

The present invention relates to machines for welding the longitudinal seam in tubular articles.

It is the object of the present invention to provide a new and improved type of welding machine for this purpose, which is largely automatic and performs the various operations upon the work with a high degree of efficiency.

With this object in view, one feature of the invention contemplates the provision of mechanism for automatically delivering tubular spokes or similar articles singly and in predetermined relation to a work carrier, together with mechanism for automatically controlling the movements of the carrier in a manner to present the tubular spokes to the welding mechanism and to discharge the spokes after the welding operation is completed.

A further feature of the invention contemplates the provision of a carrier for supporting the spoke or other article, a welding electrode, and means for relatively moving the spoke carrier and welding electrode to cause the electrode to move from end to end of the spoke at a uniform rate of speed.

A still further feature of the invention contemplates the provision of a compound welding roll having portions of current conducting material separated and insulated from one another by an intermediate portion of insulating material, such as carborundum, bakelite, or the like, this intermediate portion being adapted to roll over and lay down the flash which may be thrown up on the outside of the tubular article by the welding operation.

Still further features of the invention consist in various novel features of construction, combinations and arrangements of parts hereinafter described and claimed, the advantages of which will be obvious to those skilled in the art from the following description.

In the accompanying drawings illustrating the preferred form of the invention, Fig. 1 represents a longitudinal section in elevation of the improved machine; Fig. 2 is a top plan view of the machine shown in Fig. 1, with the transformer removed; Fig. 3 is a plan view of the machine bed and the parts supported beneath; Fig. 4 is a cross section in elevation of the machine taken upon the line 4—4 of Fig. 1; Fig. 5 is a section in elevation taken upon line 5—5 of Fig. 1 and illustrating the mechanism for reciprocating the movable electrodes; Fig. 6 is a detail illustrating the interrupted gearing for intermittently operating the work carrier; Fig. 7 is a detail illustrating a portion of the connecting mechanism for imparting a constant speed reciprocating motion to the movable electrode; Fig. 8 is a detail illustrating an end elevation of the mechanism for actuating the feeding fingers; Fig. 9 is a detail illustrating a plan view of the feeding fingers, together with the actuating cams; Fig. 10 is a section in elevation of one of the work carrier heads, illustrating the manner in which each tubular article is gripped by the head at its opposite ends; Fig. 11 is a detail illustrating a portion of the mechanism for actuating the article engaging clamps, Fig. 12 is a detail also illustrating a portion of one of the work engaging clamps; Fig. 13 is a detail illustrating the stationary cam rib which engages successively with the work clamps to withdraw them into an inoperative position; Fig. 14 is a detail illustrating the manner in which each spoke is suspended at opposite ends; Fig. 15 is a detail illustrating a side elevation of the electrode roll and housing; Fig. 16 is a side elevation of the roll partly in section, illustrating the manner in which the roll engages with the spoke to be welded; Fig. 17 is a cross section in elevation of the electrode roll and supporting mechanism taken upon line 17—17 of Fig. 15; Fig. 18 is a longitudinal section taken through one of the sections of the electrode roll and illustrating the cooling passages formed therein; Fig. 19 is a detail illustrating the secondary of the welding transformer and the manner in which it is connected with the roll shaft; Fig. 20 is a detail of the mechanism for handling the tubular spokes; Fig. 21 is a section of the same mechanism taken upon the line 21—21 of Fig. 20; Fig. 22 is a detail of the mechanism for locking the spoke carriers; Fig. 23 is a detail showing the timing device for controlling the flow of current through the electrode roll; and Fig. 24 is a section of the timer taken upon the line 24—24 of Fig. 23.

The present invention is intended primarily for automatically welding the longitudinal seam of a previously formed metal tube. In the illustrated embodiment of the invention these metal tubes when completed are intended for use as spokes in metal vehicle wheels. According to the invention generally, the formed tubular spokes are fed singly and in timed relation to a transfer mechanism which deposits each spoke automatically with the longitudinal seam properly located between the heads of a rotary work carrier. Thereafter the tubular spoke is securely gripped at its opposite ends and is moved by the work carrier into operative position beneath an electrode roll which traverses longitudinally of the tubular spoke at a constant speed to butt weld the adjacent edges of the seam while these edges of the article are maintained in closed relation by suitable pressure mechanism operating in conjunction with the electrode roll. The rotary work carrier has a plurality of work receiving stations and the movements of the carrier are so timed with respect to the movements of the electrode roll that a spoke is completely welded during the longitudinal movement of the electrode roll in one direction, the carrier advancing to bring a new spoke into operative position after the electrode roll has left the previous spoke and prior to its return into engagement with the next spoke. The transfer of successive spokes to the work carrier and their discharge therefrom when completed is automatic and is coordinated with the movements of the electrode roll. The butt welding of the longitudinal seam is accomplished by a compound roll provided with work-engaging portions of conducting material separated from one another by an insulating medium, the whole being designed and arranged in such a manner that the opposite edges of the metal tube are softened and welded without leaving an aggravated flash or ridge along the welded seam, which may subsequently require a special operation for its removal. The roll is automatically lifted from the work at opposite ends of its stroke, the current being cut off just prior to this lifting movement in order to avoid arcing between the roll and work.

In the illustrated embodiment of the invention, the work is in the form of tubular spoke members indicated at 25, each of which is provided at its opposite ends with extending lugs 26 for a purpose to be presently described. The work is fed to an inclined table 28 either manually or otherwise and from the table the individual spoke members are delivered singly and in timed relation to the inclined delivery chute 30. This delivery of the spoke members in the proper sequence is accomplished by means of two sets of control members indicated at 32 and 33 respectively. Each set of control members comprises coacting members which engage the work between them, the two sets of members serving to control the movement of successive spokes in such a manner that as the rearward members open to deliver a spoke, the forward members close to receive it. The operation of these feed members will be clear from an inspection of Fig. 9. As observed, each of the members 32 and 33 slides upon the table 34 transversely of the direction of movement of the tubular articles, the several plungers being constrained to move in guideways 36 formed by overhanging plates 37 secured to the table. The relative positions of the escapement members are controlled by sliding cam plates 38 and 39 respectively which are provided with suitably designed cam slots 40 and 41, which are connected with the escapement members through studs 42 projecting downwardly into the slots, as clearly evident. When the cam slots have been moved to one extreme position in the direction of the arrow, the rearward set of escapement members is opened to permit the spoke to advance by gravity until engaged and held between the forward set of members. Thereafter when the cam plates are moved in the opposite direction the rearward set of members is first closed to engage and hold a spoke fed between them and the forward set of members is next opened to permit the escape of a spoke from therebetween down the inclined chute. Upon the next reversal of movement of the cam plates in the direction of the arrow, the forward members are first closed and the rearward members are next opened to repeat the cycle of operation. With this construction there is no possibility of the individual spokes becoming caught and held between the escapement members, the inner ends of which are rounded, as shown, to facilitate the passage of the spokes therethrough. It will be observed that this construction affords a simple and efficient mechanism for delivering the spokes singly and in orderly sequence to the delivery chute without the liability of individual spokes catching or cramping between the feed members. The cam plates 37 and 38 are reciprocated in unison from a rock shaft 44 having rocker arms 45 connected thereto which are locked at their upper ends to engage with lugs 46 depending from the under sides of the plates. The rock shaft 44 is provided with a rocker arm 48 at one end which is connected with an eccentric strap 49 surrounding an eccentric 50 mounted upon the shaft 52, as shown in Figs. 1 and 8. The shaft 52 is continuously rotated during the operation of the machine from the main drive shaft 54 through spur gears 55 and 56.

After the tapered spokes have been delivered singly to the inclined chute 30 with the small ends in advance the spokes continue their movement by gravity until the contact with a stop wall 60, as shown in Fig. 1. In this position the spokes rest upon the inclined surface of a transversely movable platform 62 which is designed to move from under the spoke after its deposit thereon, and drop the spoke member upon the surface of a stationary table 65, as shown in Fig. 21. During the movement of the platform, the spoke is held against a wall 61 forming a continuation of one side of the chute. Upon the return movement of the platform in the opposite direction, the spoke is engaged and pushed along the surface 65 onto parallel supporting ledges 63 and 64 which engage with the lugs 26 formed upon opposite ends of the spokes, as indicated in Fig. 3. It will be observed that by virtue of this construction, the spokes, during the transfer from the inclined surface 62 to the supporting ledges, are automatically arranged with the lugs 26 at the top. Inasmuch as these lugs are located in a predetermined position with relation to the open seam to be welded, it is clear that the result is to automatically locate the longitudinal seam in a predetermined position for all of the spokes, or, in other words, at the under side of the spoke, as shown in Fig. 14. The platform 62 is reciprocated in transverse ways formed in the machine frame by a rocker arm 66 operated by an eccentric 68 through an eccentric strap 69 and a second rocker arm 70 mounted upon the rock shaft 71. The eccentric 68 is mounted upon a counter-shaft 72 extending longitudinally of the machine frame and driven from the shaft 52 through intermeshing miter gears 75 and 76, as shown clearly in Fig. 3. The spoke member is moved to the right in Figs. 3 and 21 by the engagement of fingers 73 depending from the platform and adapted to push the spoke along the ledges without dislodging or turning it into the position shown in Fig. 3.

From the position shown in Fig. 3, each spoke is transferred to a rotary work carrier having coacting heads which engage with the opposite ends of the spoke. This transfer of the spoke members is conveniently accomplished by an intermediate carrier 78, as shown in Figs. 1 and 3, which engages with the spoke from below and lifts the spoke from the supporting ledges into the position shown in Fig. 1. From an inspection of Figs. 1, 3 and 10, it will be observed that the intermediate carrier is provided with two arms 80 and 81 respectively, which have spoke receiving beds or grooves formed in their upper faces, these grooves being shaped in accordance with the curvature of the spoke or other member and adapted to prevent a turning movement of the member when picked up from the supporting ledges so that the spoke is delivered to the rotary work carrier with the longitudinal seam on the under side, as shown in Fig. 10. The intermediate carrier or transfer member is secured to a vertical slide 85 which is supported for movement in vertical guideways mounted upon the machine frame. The slide is reciprocated in timed relation to the movements of the rotary carrier and platform through a crank arm 90 which is connected at its outer end with a transverse slot 92 formed in the slide member. The crank arm is connected to a crank shaft 93 which is driven from the counter-shaft 72 through intermeshing gears 95 and 96. Upon referring to Fig. 4, it will be observed that the central portion of the slot 92 through a short portion of its length is curved in conformity with the arc of movement of the crank arm in order to impart a perceptible dwell to the carrier at the top of its stroke or during the time that the spoke is being engaged and clamped between the heads of the rotary work carrier.

After the delivery of the spoke by the intermediate carrier to the position shown in Fig. 1, it is engaged and picked up by a rotary work carrier, shown generally in Figs. 1 and 4, and comprising two coacting heads between which the ends of the spokes are clamped. This carrier is provided with a series of spoke receiving stations, which number four in the illustrated embodiment of the invention. Of these stations, the one at the bottom of the carrier may be denoted the "loading station", the one at the top of the carrier the "operating station", the one midway between as the "inspection station", and the one at the back side of the carrier in Fig. 1, the "unloading station". The movement of the carrier is intermittent and takes place between the operations upon the work during which time the carrier is stationary.

As shown clearly in Fig. 1, the work carrier consists of two rotating heads 100 and 102 which are journaled in supports 104 and 106, respectively, adjustably mounted on the bed of the machine frame. As shown in Fig. 10, each head is provided with an elongated hub 108 having a thrust collar 109 pinned to the rear end to retain the head in assembled relation with the supporting member. Passing entirely through both of the heads is a driving shaft 111 to which the heads are splined by keys 113 and a keyway 115. With this construction, the two heads are rotated in unison with the spokes held therebetween. The intermittent rotation of the work carrier is accomplished by means of the interrupted gears 118 and 119, as shown in Figs. 1 and 6. Upon referring to Fig. 6, it will be observed that the driving gear 118 is provided with only a small number of teeth at one portion of its periphery which intermittently and successively engage with four sets of teeth formed upon the periphery of the gear 119 to impart four quarter revolutions to the shaft 111 during four continuous revolutions of the gear 118. This construction serves to impart the desired intermittent movement to the rotary work carrier during the continuous movement of the driving member. It will be observed that the driving gear 118 is occupied in moving the work carrier during a relatively small portion of a rotation so that the time occupied in moving the carrier from one position to the next is relatively small as compared to the time during which the carrier is held stationary. It will be further observed that during the time that the faces 120 engage with the unbroken portion of the gear 118 the shaft 111 and the rotary work carrier are locked against rotary movement so that the work is held rigidly in place during the operation of the electrode roll thereon. The driving gear 118 is mounted upon a stub shaft 122 which is driven from a vertical shaft 123 through intermeshing beveled gears 125. The vertical shaft 123 is connected at its lower end with the crank shaft 93 through intermeshing beveled gears 127, all as shown in Fig. 1. Referring again to the rotary work carrier, each of the heads 100 and 101 is provided with a series of spoke engaging clamps 130 which, as indicated, engage and clamp the opposite ends of a spoke between them. Each of the spoke clamps is provided with a recess or opening 132 which receives one of the lugs 26 formed upon the end of the spoke and with a beveled extension or boss 134 which in size and shape conforms to the shape of the inner contour of the spoke in order that the latter may be held firmly in place without turning or twisting. Each of the spoke clamps is detachably secured to a slide 136 which is supported for movement in dovetailed ways 138 extending transversely of the head, as shown clearly in Fig. 12. The end clamp 130 is seated in a slot 140 formed in the slide 136 and is secured to the slide by bolts 142. The slide 136 is moved bodily in a direction to cause the end clamp to engage a spoke by a coiled spring 144 seated in a recess 146 formed in the head. The coiled spring engages behind the end 148 of an adjusting screw 150 which is threaded in a lateral extension 151 of the slide 136, as shown in Fig. 10. By turning the adjusting screw with relation to the slide, the pressure of the clamp 130 on the end of the spoke may be varied as desired. The position of the slide when there is no spoke between the clamps is determined by a stop screw 153 threaded in the head and passing loosely through the extension 151, the stop screw having a nut 154 threaded thereon which is adapted to engage with the extension and limit the outward movement of the slide, as shown. With this construction it will be observed that the spoke clamps are normally moved together by the spring 144 to firmly clamp the spokes between them. The clamps are automatically moved apart at a predetermined point in the rotation of the work carrier to deliver the spokes from the carrier and are thereafter moved toward one another at a predetermined point to engage and clamp spokes which are supported between them. To this end each of the supports 104 and 106, as shown in Figs. 10 and 11, is provided with a stationary cam rib 160 secured to a flange 162 formed upon the supporting member. This cam rib is concentric with the axis of the carrier and is provided with a cam face 164 adapted to be engaged by a cam shoe or wiper member 166 connected with each of the slides 136. As will be observed from an inspection of Fig. 13, the cam rib is provided with an inclined surface 168 which is at first engaged by the contact shoe to separate the clamps and permit the spoke to be disengaged from the carrier. Thereafter during substantially a quarter of a revolution of the carrier, the clamps are maintained in a separated or open position by engagement with the surface 169 of the cam rib. When the work carrier in its rotation reaches a point at which the spoke clamps 130 are about to register with the ends of a spoke supported in the member 78, the shoe 166 passes beyond the surface 169, permitting the clamps to be quickly moved together under the action of the springs 144 to engage and clamp the spokes between them. It will be obvious that this inward or clamping movement takes place practically simultaneously with the stopping of the rotary carrier. In order to accurately adjust the point at which the clamps are released by the cam rib, each contact shoe 166 is adjustably secured to the slide 136. As indicated in Fig. 11, the shoe is provided with a curved tail-piece 167 seated upon a similarly formed extension upon the slide and is adjusted circumferentially through the medium of an adjusting screw 170. The contact member is rigidly locked in adjusted position by a bolt 172 passing loosely through an opening in the piece 167 and threadedly engaging with the rear end of the slide 136. This construction permits the engaging point of the work clamps to be accurately determined with respect to the rotation of the work carrier.

From the foregoing description it will be evident that the ends of the spokes are yieldingly held between the work clamps during the rotation of the work carrier. During the welding operation there is a pronounced drag upon the spoke in a lengthwise direction which it is desired to positively resist. With this end in view, therefore, the work clamps engaging with opposite ends of each spoke are positively locked in clamping position during the time that the spoke is positioned at the "operating station". On referring to Figs. 1 and 10, it will be noted that the shaft 111 carries cam members 350 which serve to control the movements of locking plungers 352 which are slidingly mounted in a head 354 formed upon each of the members 104 and 106. Each of these locking plungers is adapted to engage behind the work clamping slide 140 which is in operating position, as clearly evident in Fig. 10. The locking plunger is connected with the operating cam 350 in such a manner that its inward position may vary in accordance with the adjustment of the slide and will lock the slide in any adjusted position. For this purpose, the inner end of the locking plunger is provided with an inclined face 360 which is engaged by an inclined face 362 formed upon an operating plunger 364 constrained to move at right angles to the movement of the plunger 352. The operating plunger loosely receives a stem 366 provided at its lower end with a cam shoe 368 which rests upon the rotary cam 350, as shown clearly in Figs. 10 and 22. The movement of the cam shoe is yieldingly communicated to the operating plunger 364 through a compression spring 370 which is interposed between the plunger and the shoe 368. The locking plunger 352 is normally returned to a released position by a spring 372, as indicated. With this construction, it will be evident that as the cams 350 are rotated with the work carrier, an inward locking movement is imparted to the plunger 352 upon the engagement of each of the four projections 374 on the cam with the cooperating cam shoes 368. The locking plunger is moved inwardly until it engages with the adjacent face of the slide 136 and is thereafter positively locked in operating position until the rotation of the carrier permits the plunger to be released.

As the spokes are initially clamped in the rotary carrier with the longitudinal seam underneath, a one-half revolution of the carrier brings the seam to be welded at the top of the spoke, as indicated in the drawings. In this position while the spoke is held stationary by the work carrier an electrode roll is caused to traverse longitudinally of the spoke to weld a seam from end to end. During the movement of the electrode roll thereover, the opposite sides of the spoke are engaged and held rigidly by pressure members which aid in maintaining the seam closed during the welding operation. As shown in Fig. 1, a roll carrying head 180 is supported above the work carrier by members 182 and 184 which in turn are detachably mounted upon the main bed 190 of the machine. The head 180 is provided with parallel guide members 192 and 193 which are parallel to the axis of the work carrier, these guide members supporting a roll carriage 194, as shown in Figs. 1 and 15. The carriage 194 is provided with a downwardly projecting roll housing 196 within which is supported an electrode roll, indicated at 200. The electrode roll is journaled within a bearing frame 202 having an upper portion 203 and a lower portion 204 connected thereto by bolts 205. The bearing frame with the electrode roll journaled therein is mounted for vertical movement within the housing 196 and to this end the frame 202 slidingly engages with ways, indicated at 206 and 207, formed upon the interior of the housing, as shown in Fig. 17. The roll carrying frame is connected to the upper portion of the slide 194 through a stem 210 which is threaded at its lower end into the upper portion 211 of the frame. Surrounding the stem 210 is a sleeve 212 threaded in a boss 213 formed in the upper portion of the slide and interposed between the lower end of the sleeve 212 and the roll carrying head is a comparatively heavy compression spring 215 which serves to yieldingly retain the electrode roll in contact with the work. The stem 210, as indicated in Fig. 17, slides freely within the sleeve 212, the downward movement being limited by a stop collar 218, the position of which is determined by a check nut 219. During the movement of the electrode roll along the spoke, the latter is engaged upon opposite sides by pressure members. In the present construction two pressure rolls 225 are journaled in pressure slides 227 which are slidingly supported for movement to and from one another in a head 230 detachably secured to the underside of the housing 196. As indicated in Fig. 17, each slide 227 is slidingly received in an opening 231 formed in the head and is engaged by a spring 232, tending to move the slide and pressure roll toward the work. The movement of the roll under the action of the spring is limited by the engagement of a stop nut 234 connected to the stem 235 with the end of a sleeve 237 threaded in the head, as shown. With this construction, the spoke is firmly engaged upon opposite sides at a point approximately opposite the point of the welding operation so that there is no opportunity for the spoke to be distorted or for the seam to open under the pressure of the welding roll. The welding roll consists essentially of two similarly shaped disks 238 and 239 which are insulated from one another and from the machine as a whole, the welding current passing from one disk to the other through the seam to be welded, in the usual manner. Each disk is provided with an elongated hub 240 which is journaled in the sides of the bearing frame and is insulated therefrom by an insulating bushing 242 and an insulating disk 243 interposed between the adjacent faces of the bearing frame and the disk. The contact disks 238 and 239 are separated from one another by a relatively thin sheet 245 of carborundum or similar material, which, as indicated in Fig. 17, bears directly upon the seam, the parts of the electrode roll when assembled presenting a circumferential groove 247 which conforms approximately to the curvature of the part to be welded, the central member of insulating material bearing upon the seam and the sections 238 and 239 of conducting material engaging with the spoke upon opposite sides of the seam, as clearly shown in the drawings. The parts of the electrode roll are retained in assembled relation by a plurality of bolts 250 which are received in recesses formed in the disk 238 and are completely insulated therefrom by insulator bushings 252, extending into and through the carborundum disk 245. With this construction it will be observed that the two sections of the electrode roll are completely insulated from one another and from the bearings and machine frame. The hub members 240 extend transversely through openings 254 formed in the roll housing 196 without contacting therewith. These hub members, as indicated in Fig. 4, are received and journaled at their outer ends in massive heads 260 which provide an electrical connection between the hubs and a massive conductor 262, forming the secondary of a stepdown transformer, which has a primary indicated at 265 and a laminated core 270 as is usual in these constructions. As indicated in Figs. 4 and 19, the lower ends of the U-shaped secondary are clamped in a split clamp member 266 forming a part of the head and the upper end passes loosely through the primary coil in such a manner that the lower ends of the secondary may swing longitudinally to follow the traversing movements of the roll. The secondary is preferably in the form of a rigid bar which is extended outwardly a sufficient distance to prevent any liability of short circuiting between the moving bar and the sides of the machine frame.

It is desirable to provide means for artificially cooling the electrode roll during its operation. To this end a circumferential cooling passage 272 is formed in each half of the roll and is connected through short passages 273 and 274, as shown in Fig. 18, with circulating pipes 275 and 276 mounted in the hub of the roll, these pipes extending outwardly beyond the opposite ends of the hub members, as shown in Fig. 4, and being adapted for connection to any flexible system of piping desired. With this construction, water or other cooling fluid is caused to circulate through the sections of the electrode roll and dissipate the heat which is necessarily generated by the passage of the welding current. Upon referring to Figs. 4 and 17 it will be noted that the hub members 240 are made of two sections which are retained in assembled relation by through-bolts 278 and 279, extending throughout the length of the hub and threadedly engaging at their inner ends with the sections of the electrode roll. As stated previously, the electrode roll during its traversing movement along the length of the spoke is yieldingly retained in engagement with the spoke by the spring 215. At opposite ends of its travel, however, the electrode roll is automatically elevated to avoid engagement with the spoke supporting members. For this purpose the head 192 is provided with depending side portions 280 provided with rails 282, as indicated in Figs. 1, 4 and 17, to form tracks upon which rolls 284 journaled upon the outer ends of the arms 285 may ride. These arms, as indicated in Fig. 17, extend laterally from the opposite sides 202 and 203 of the roll carrying head. Supported at opposite ends of the rails 282 are inclined surfaces 286 and 287 which in the present construction are formed upon adjustable blocks 288 connected with the rails by threaded adjusting members 290, as indicated in Fig. 1. By making provision for longitudinal adjustment of the inclined surfaces the points at which the roll is elevated from the work may be accurately varied as desired. In the usual operation of the machine the electrode roll in its engagement with the spoke is above the position determined by the face 282 which merely serves to limit the downward movement of the roll in the event that the roll is operated with no work supported therebeneath. Owing to the shape of the end clamp the electrode roll may be caused to traverse throughout substantially the entire length of the spoke without liability of contacting with the holding members. As shown in Figs. 10 and 12, the end clamps conform in shape and size to the shape of the spoke and when the spoke is engaged therewith, the upper portion of the clamp which might be engaged by the electrode roll is substantially flush with the outer surface of the spoke. This permits the electrode roll to be maintained in engagement with the spoke until approximately the end of the spoke is reached.

The current is automatically cut off from the electrode roll just prior to the lifting of the latter from the work and is cut in an instant after the roll is brought into contact with the work to start the welding operation. The control of the current, as described, is accomplished through a timing device associated with the electrode carriage and controlled by the movement of the carriage. Mounted upon the carriage, as shown in Fig. 17, is a track consisting of a length 400 of insulating material and a length 402 of conducting material, the track as a whole being insulated from the carriage by an insulator support indicated at 404 of substantially U-shaped form, as indicated in Fig. 17. This track, as will be obvious, moves with the electrode carriage and has cooperating therewith two brushes 406 and 408 of carbon or similar material. Each of these brushes is mounted upon a support 410 adjustable lengthwise of a bracket 412 which is connected to the head 180. As indicated particularly in Figs. 23 and 24, each supporting plate 410 is slidable longitudinally on the vertical face of the supporting bracket 412 through tongue and groove connections indicated at 414. The supporting plates are locked in any desired longitudinal position by locking bolts 416 received in a longitudinal slot 418 formed in the bracket and adapted to rigidly clamp the plate 410 against the face of the bracket through a nut 420, as clearly evident from Fig. 24. The longitudinal adjustment of each of the supporting plates 410 is conveniently accomplished through a lead screw 422 pinned at its inner end to the plate and having its outer threaded portion engaged upon opposite sides of the web 424 by nuts 426 and 428, the turning of these nuts tending to draw the lead screw, together with the supporting plate, longitudinally. The carbon brushes or pencils 406 and 408 are yieldingly maintained in engagement with the track 402 by springs 430 which tend to automatically feed the brushes as the contacting faces are worn away. The brushes as a whole and the connecting leads are insulated from the supporting brackets and the machine frame. To this end, each brush is slidingly supported in an insulating bushing 432 and the pressure spring 430 is interposed between collars 434 and 436 of insulating material connected respectively to the upper end of the brush and to a lateral extension 438 of the plate. Each of the leads indicated at 440 passes through the insulating collars 436, 434 and is connected to the brush at its lower end. This construction, as above described, functions as a circuit controlling device for the welding electrodes. When both brushes are in contact with the conducting portion of the track 402, the circuit is closed and current flows to the electrode roll. When one of the brushes, however, passes from the conducting to the insulating portion 400 of the track, the circuit is broken and current is cut off from the roll. It will be obvious that by proper adjustment of the brushes with relation to the track and to one another, the opening and closing of the circuit at opposite limits of movement of the electrode carriage may be accurately determined. The controlling device is connected into the primary of the transformer circuit in a manner which will be obvious to those skilled in the art, to control the flow of current through the secondary of the transformer by cutting off or by a control of the relatively small current at high voltage passing through the primary.

The machine is designed to complete the welding of two spokes during each back and forth movement of the electrode roll. To this end the work carrier is held stationary during the lengthwise movement of the roll and is rotated to advance a new spoke into position subsequent to the passage of the roll from the end of the spoke and prior to its return into engagement with the next spoke. In order to insure a uniform welding action throughout the entire length of the spoke, mechanism is provided for imparting a constant speed of movement to the electrode roll while in contact with the spoke. To this end the slide 194 is rigidly connected with a crosshead 300 through an arm 301. The crosshead 300 is slidably supported in ways 303 formed in a head casting 305 and extending parallel to the direction of movement of the roll, as shown in Figs. 1 and 5. Connected with the cross head and serving to reciprocate the latter in the ways 303 is a variable throw crank 308 provided with a crank pin 309 running in a transverse slot 310 formed in the crosshead. The variable crank 308 is connected to rotate with the vertical shaft 123 through a disk 312 keyed to the top of the shaft and having ways 314 in which the crank slides, as shown in Figs. 1 and 5. The throw of the crank arm is controlled by a cam path 318 formed in a stationary cam disk 320 supported concentrically with the shaft 123 on the head 184, as shown clearly in Fig. 1. With this construction the crank arm is rotated at a constant speed with the drive shaft 123 through the engagement of the crank arm with the ways 314 and the throw of the crank arm is automatically controlled through the engagement of the roll 322 with the compensating cam path 318 in a manner to impart a reciprocating movement to the electrode slide which is constant throughout substantially its entire length.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:

1. A machine for welding tubular articles comprising a work holder, a welding electrode, means for feeding tubular articles singly and in predetermined relation to be engaged by the work holder, and means for imparting a step by step rotation to the work holder to bring the articles supported thereon successively into operating position with respect to the electrode.

2. A machine for welding tubular articles comprising a work holder, means for automatically presenting the articles successively to be engaged and supported by the work holder, means for actuating the work holder to move the articles supported thereon successively into operative position, a welding electrode, and means for relatively moving the work holder and welding electrode to perform the welding operation upon the article.

3. A machine for welding tubular articles comprising oppositely disposed work clamping heads adapted to engage and hold a tubular article between them, a welding electrode movable axially of the heads and of the article to be welded, and means for rotating the heads to bring the article into the path of the welding electrode.

4. A machine for welding tubular articles having a longitudinal seam comprising an inclined chute, means for delivering the articles successively to the chute, a work carrier, and means for transferring the tubular articles from the inclined chute to the work carrier designed to arrange the articles with the longitudinal seam in a predetermined position with respect to the work carrier.

5. A machine for welding tubular articles comprising a rotary work carrier, an inclined chute, article delivery mechanism cooperating with the chute, a transfer table adapted to remove articles from the chute and deliver them in a predetermined relation beneath the work carrier, and a second transfer mechanism adapted to receive the articles thus delivered and introduce the articles automatically into the carrier.

6. A machine for welding tubular articles comprising a rotary work carrier, a transfer mechanism designed to deposit spokes with the longitudinal seam located in a predetermined relation in the work carrier, and means for feeding the spokes singly and in timed relation to the transfer mechanism.

7. A machine for welding tubular articles comprising cooperating work clamps, means for automatically presenting a tubular article between the work clamps, means for actuating the clamps to yieldingly engage the opposite ends of the article, and means for rotating the work clamps to move the article into operative position.

8. A machine for welding tubular articles comprising a work carrier, means for delivering tubular articles singly and in a predetermined relation to the work carrier, means for rotating the work carrier to bring the articles into operative position, a welding electrode, and mechanism for moving the electrode lengthwise of an article supported upon the work carrier at a uniform rate of speed.

9. A machine for welding tubular articles comprising cooperating work clamps, means for actuating the clamps to yieldingly engage the opposite ends of a tubular article between them, and means for positively locking the clamps in one position to prevent disengagement of the tubular article.

10. A machine for welding tubular articles comprising a work carrier having a plurality of article receiving stations, a welding electrode cooperating with the work carrier, means for reciprocating the electrode axially of the work carrier, and means for intermittently rotating the work carrier in timed relation to the movements of the electrode.

11. A machine for welding tubular articles comprising a rotary work carrier adapted to receive and support the tubular articles, a welding electrode, means for reciprocating the electrode axially of the work carrier at a constant speed, and mechanism for rotating the work carrier during the reversal of movement of the electrode and for locking the work carrier in a stationary position during the major portion of the movement of the electrode thereover.

12. A machine for welding tubular articles comprising an inclined chute, two sets of work holding fingers controlling the delivery of tubular articles to a chute, and means for actuating the fingers to deliver articles successively to the chute.

13. A machine for welding tubular articles comprising a delivery chute, two sets of work holding fingers adapted to control the movements of successive spokes, and mechanism for actuating the fingers designed to open one set of fingers after the cooperating set is closed and vice versa.

14. A machine for welding tubular articles comprising a delivery chute, parallel spoke supporting ledges, means for depositing spokes upon the ledges with projecting lugs at opposite ends of the spokes engaged thereby, a work carrier, and means for delivering the spokes from the ledges to the work carrier.

15. A machine for welding tubular articles comprising a delivery chute, work holding fingers cooperating to deliver tubular spokes in timed realtion to the chute, a work carrier, transfer mechanism actuated in timed relation to the delivery of the spokes adapted to transfer spokes from the delivery chute to the work carrier, and mechanism for actuating the work carrier to clamp the spokes therein upon delivery.

16. A machine for welding tubular articles comprising an inclined delivery chute designed to constrain tubular articles for movement thereover in a lengthwise direction, transfer mechanism designed to remove tubular articles from the delivery chute transversely and to arrange the articles in a predetermined relation, a work carrier, and means for delivering spokes from the transfer mechanism to the work carrier.

17. A machine for welding tubular articles comprising rotary clamping heads, article clamps yieldingly connected with the heads and normally tending to move into a clamping position, and means for holding the clamps in an inoperative position during a predetermined portion of the rotation of the heads.

18. A machine for welding tubular articles comprising two rotating heads, mechanism for intermittently rotating the heads, a series of work clamps connected with each head, means for normally moving the work clamps toward one another, means for limiting the inward movement of the work clamps, and means for automatically moving the work clamps into an inoperative position.

19. A machine for welding tubular articles comprising rotary clamping heads, means for rotating the heads, means for supporting the heads having provision for adjustment of the heads toward and from one another, a series of work clamps supported on each head, and spring controlled mechanism for normally moving the work clamps toward one another.

20. A machine for welding tubular articles comprising work clamping heads, means for rotating the heads, a series of work clamps yieldingly connected to each head, means for yieldingly moving the clamps into operative position, and means for successively locking the clamps in operative position.

21. A machine for welding tubular articles comprising work clamping heads, a series of work clamps yieldingly connected to each head, normally adapted to move into operative position, mechanism adapted to positively lock successive work clamps in operative position constructed and arranged to automatically compensate for variations in the operative position of the clamps.

22. A machine for welding tubular articles comprising a supporting head, a clamping head mounted for rotation within the supporting head, means for rotating the clamping head, a series of work clamps connected to the clamping head and adapted to rotate therewith, a locking plunger adapted to cooperate with and lock the work clamps successively in operative position as the head is rotated, and a cam rotating with the clamping head and adapted to actuate the locking means.

23. A machine for welding tubular articles comprising work clamping heads adapted to engage and clamp the opposite ends of a tubular article between them, an electrode roll supported above the clamping heads, mechanism for reciprocating the roll lengthwise of a tubular article supported between the heads, and mechanism for intermittently rotating the heads to present the article successively in operative position beneath the roll.

24. A machine for welding tubular articles comprising work clamping heads, a series of clamps on each head, means for delivering tubular articles successively to the under side of the work clamping heads, an electrode roll, means for supporting the roll for rectilinear movement above the heads, and means for intermittently rotating the heads to successively present tubular articles to the roll.

25. A machine for welding tubular articles comprising a work carrier, a welding electrode, mechanism for moving the electrode in a direction lengthwise of the work carrier, mechanism for rotating the carrier, and mechanism cooperating with the carrier to engage a tubular article therein at a predetermined point in the rotation and to automatically discharge an article therefrom at a predetermined point in the rotation of the carrier.

26. A machine for welding tubular articles comprising a work holder, an electrode roll cooperating with the holder and consisting of two disks of conducting material separated by a disk of insulating material adapted to engage and roll down the flash, means for positively pressing the sides of the tubular article to close the seam to be welded, and means for conducting current to the disks of conducting material.

27. A machine for welding tubular articles having a longitudinal seam comprising a work holder, an electrode roll adapted to engage an article presented by the work holder and consisting of two disks of conducting material separated by a relatively thin sheet of hard insulating material, the peripheral surfaces of the disks and the insulating sheet being designed to form a peripheral groove shaped approximately to the portion of the cross section of the article adjacent to the weld, and means for positively pressing the sides of the article during the welding operation.

28. A machine for welding a tubular article having a longitudinal seam comprising a work holder, an electrode roll comprising two disks of conducting material adapted to engage the tubular article presented by the work holder on opposite sides of the seam and shaped to conform to the article adjacent to the seam, a thin sheet of hard insulating material between the disks adapted to engage and roll down the flash, and yieldingly means pressing on the sides of the article during the welding operation to close the seam.

29. A machine for welding tubular articles comprising a work holder, a traveling carriage movable lengthwise of the work holder, an electrode roll journaled in the carriage for rotation along the work, pressure rolls mounted in the carriage, and means for supporting the pressure rolls adapted to cause the latter to yieldingly engage with opposite sides of the tubular article to be welded.

30. A machine for welding tubular articles comprising a work holder, a traveling carriage, means for moving the carriage lengthwise of the holder, an electrode roll supported on the carriage, means for yieldingly maintaining the roll in engagement with the work, and means for automatically removing the roll from engagement with the work at a predetermined point in the lengthwise movement of the carriage.

31. A machine for welding tubular articles comprising a work holder, a carriage movable lengthwise of the work holder, an electrode roll supported for rotation in the carriage, an electrical circuit including the roll, and current control mechanism designed to automatically cut off the flow of current to the roll at a predetermined point in the lengthwise movement of the carriage.

32. A machine for welding tubular articles comprising a work holder, a carriage movable lengthwise of the work holder, an electrode roll journaled for rotation in the carriage, means for automatically removing the roll from engagement with the work at a predetermined point in the movement of the carriage, an electrical circuit including the roll, and means for automatically cutting off the current flow through the roll prior to the disengagement of the roll with the work.

33. A machine for welding tubular articles comprising a work holder, a carriage movable lengthwise of the holder, a welding electrode supported in the carriage, and means for controlling the time of flow of current to the roll comprising a track movable with the carriage and having portions formed respectively of conducting and insulating material, and stationary brushes cooperating with the track to control the flow of current to the welding electrode.

34. A machine for welding tubular articles comprising a work holder, a carriage movable lengthwise of the holder, a welding electrode supported upon the carriage, means for normally maintaining the electrode in engagement with the work, and means having provision for adjustment to automatically disengage the welding electrode from the work at a predetermined point in the movement of the carriage.

35. A machine for welding tubular articles comprising a work holder, a movable welding carriage, a welding electrode supported by the carriage, means for controlling the time of flow of current to the welding electrode comprising a track having two portions formed respectively of conducting and insulating material, two brushes cooperating with the track, mechanism for relatively moving the track and brushes, and means for adjusting the relative position of the brushes to permit variation of the point at which current is cut off from the roll.

36. A machine for welding tubular articles comprising a work holder, a welding electrode, and mechanism for relatively moving the work holder and electrode in a lengthwise direction and at a uniform speed including a rotary shaft, means for rotating the shaft at a constant speed, a crank connected for rotation with the shaft, and means for automatically varying the effective length of the crank at different points in the rotation of the shaft.

37. A machine for welding tubular articles comprising a work holder, a welding electrode, a shaft, means for rotating the shaft, a crank connected for rotation with the shaft, a stationary cam, connections between the cam and crank for varying the effective length of the crank, and connections between the crank and welding electrode for reciprocating the latter at a uniform speed lengthwise of the work holder.

38. A machine for welding tubular articles comprising a work holder, a welding electrode, mechanism for moving the electrode lengthwise of the holder, mechanism for intermittently rotating the holder including interrupted gearing adapted to partially rotate the holder in timed relation to the movements of the electrode and to lock the holder in a stationary position between the rotary movements.

39. A machine for welding tubular articles comprising a work holder, a welding electrode, mechanism for actuating the electrode relative to the holder, a stationary step-down transformer supported above the welding electrode, and a U-shaped arm of conducting material comprising the secondary of the transformer and having the ends of the legs connected with the welding electrode and adapted to move therewith and the bottom of the U passing through the primary core and adapted to form the connection about which the U-shaped member swings.

40. A machine for welding tubular articles comprising a welding electrode, mechanism for reciprocating the electrode, primary transformer coils supported above the electrode, and a substantially U-shaped conductor passing through the primary coils and having the ends of the U connected with the welding electrode.

41. A machine for welding tubular articles comprising means for holding the article, a welding electrode, a crank connected with the electrode for moving the latter lengthwise of the article, and a compensating cam connected with the crank and adapted to vary the effective length of the crank to move the electrode at a uniform speed lengthwise of the article.

42. A machine for welding tubular articles having a longitudinal seam comprising an electrode member adapted to engage the article on opposite sides of the seam, means for conducting current through the electrode member and between the metal on opposite sides of the seam, and means for engaging and holding the article at opposite ends.

43. A machine for welding tubular articles comprising means for electrically butt welding the longitudinal seam of a tubular article, and means for automatically delivering preformed tubular articles successively and at predetermined intervals to an operative position with relation to the welding means.

ARTHUR M. STANLEY.
JAMES E. SIMS.